US012635016B2

(12) United States Patent
Sawada

(10) Patent No.: US 12,635,016 B2
(45) Date of Patent: May 19, 2026

(54) WIRELESS COMMUNICATION APPARATUS, CONTROL METHOD FOR WIRELESS COMMUNICATION APPARATUS, AND STORAGE MEDIUM

(71) Applicant: CANON KABUSHIKI KAISHA, Tokyo (JP)

(72) Inventor: Tetsuya Sawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 18/486,364

(22) Filed: Oct. 13, 2023

(65) Prior Publication Data

US 2024/0129982 A1 Apr. 18, 2024

(30) Foreign Application Priority Data

Oct. 14, 2022 (JP) ................................. 2022-165566

(51) Int. Cl.
*H04W 76/15* (2018.01)
(52) U.S. Cl.
CPC .................................. *H04W 76/15* (2018.02)
(58) Field of Classification Search
CPC .............................. H04W 76/15; H04W 76/14
See application file for complete search history.

(56) References Cited

U.S. PATENT DOCUMENTS

| | | | | |
|---|---|---|---|---|
| 2013/0223280 A1* | 8/2013 | Choi | ....................... | H04W 4/06 |
| | | | | 370/254 |
| 2014/0362841 A1* | 12/2014 | Shibata | ................. | H04W 48/18 |
| | | | | 370/338 |
| 2015/0092601 A1* | 4/2015 | Ando | .................... | H04W 12/50 |
| | | | | 370/254 |
| 2015/0180970 A1* | 6/2015 | Verma | ................... | H04W 28/16 |
| | | | | 370/254 |
| 2020/0252757 A1* | 8/2020 | Kawakami | .............. | G06F 21/85 |
| 2023/0354160 A1* | 11/2023 | Gan | ...................... | H04W 76/15 |

FOREIGN PATENT DOCUMENTS

JP 2014225861 A 12/2014

* cited by examiner

*Primary Examiner* — Sudesh M. Patidar

(74) *Attorney, Agent, or Firm* — Canon U.S.A., Inc. IP Division

(57) ABSTRACT

A wireless communication apparatus includes a plurality of stations, acquires connection information to be used to establish a connection to another wireless communication apparatus, determines whether the another wireless communication apparatus is an access point or a group owner based on the acquired connection information, selects one of the plurality of stations based on a result of determination and establishes the connection to the another wireless communication apparatus using the selected STA.

8 Claims, 6 Drawing Sheets

WIRELESS COMMUNICATION APPARATUS, CONTROL METHOD FOR WIRELESS COMMUNICATION APPARATUS, AND STORAGE MEDIUM

BACKGROUND

Field

The present disclosure relates to a wireless communication apparatus, a control method for the wireless communication apparatus, and a storage medium.

Description of the Related Art

As a communication standard regarding a wireless local area network (LAN), the Institute of Electrical and Electronics Engineers (IEEE) 802.11 standard has been known. The Wireless Fidelity (Wi-Fi) standard and the Wi-Fi Direct standard defined by the Wi-Fi Alliance have also been known.

For example, as one of wireless communication apparatuses that support the IEEE 802.11 standard and the Wi-Fi standard, proposed is a wireless communication apparatus that is capable of operating a station (STA) and an access point (AP) in parallel. The wireless communication apparatus establishes a connection to an external AP using the STA, thus participating in a network formed by the external AP. Moreover, the wireless communication apparatus establishes a connection to an external STA using the AP, thus participating in a network formed by the external STA. Similarly, also proposed is an operation of the STA and a Wi-Fi Direct function in parallel.

For example, a system described in Japanese Patent Application Laid-Open No. 2014-225861 is capable of connecting simultaneously to an AP using an STA function and to a wireless communication apparatus that supports the Wi-Fi Direct standard using the Wi-Fi Direct function.

It is conceivable that a single wireless communication apparatus includes a plurality of STAs to connect to an AP (e.g., a wireless LAN router) using one STA, and connect to a group owner (GO) (e.g., a smartphone) using another STA. In such a case, after the one STA connects to the AP, if the other STA, which is supposed to connect to the GO, also erroneously connects to the AP, there occurs a state in which the wireless communication apparatus cannot connect to the GO. To prevent the occurrence of such a state, a user is to perform an operation cautiously, which is inconvenient.

SUMMARY

In view of the above-mentioned issue, various embodiments of the present disclosure are directed to an increase of operability when a wireless communication apparatus including a plurality of STAs connects to an external AP or an external GO.

According to one embodiment of the present disclosure, a wireless communication apparatus including a plurality of stations includes an acquisition unit configured to acquire connection information to be used to establish a connection to another wireless communication apparatus, a determination unit configured to determine whether the another wireless communication apparatus is an access point or a group owner based on the connection information acquired by the acquisition unit, and an establishment unit configured to select one of the plurality of stations based on a result of determination by the determination unit and establish the connection to the another wireless communication apparatus using the selected STA.

Further features of the present disclosure will become apparent from the following description of exemplary embodiments with reference to the attached drawings.

DESCRIPTION OF THE EMBODIMENTS

Figure 1:
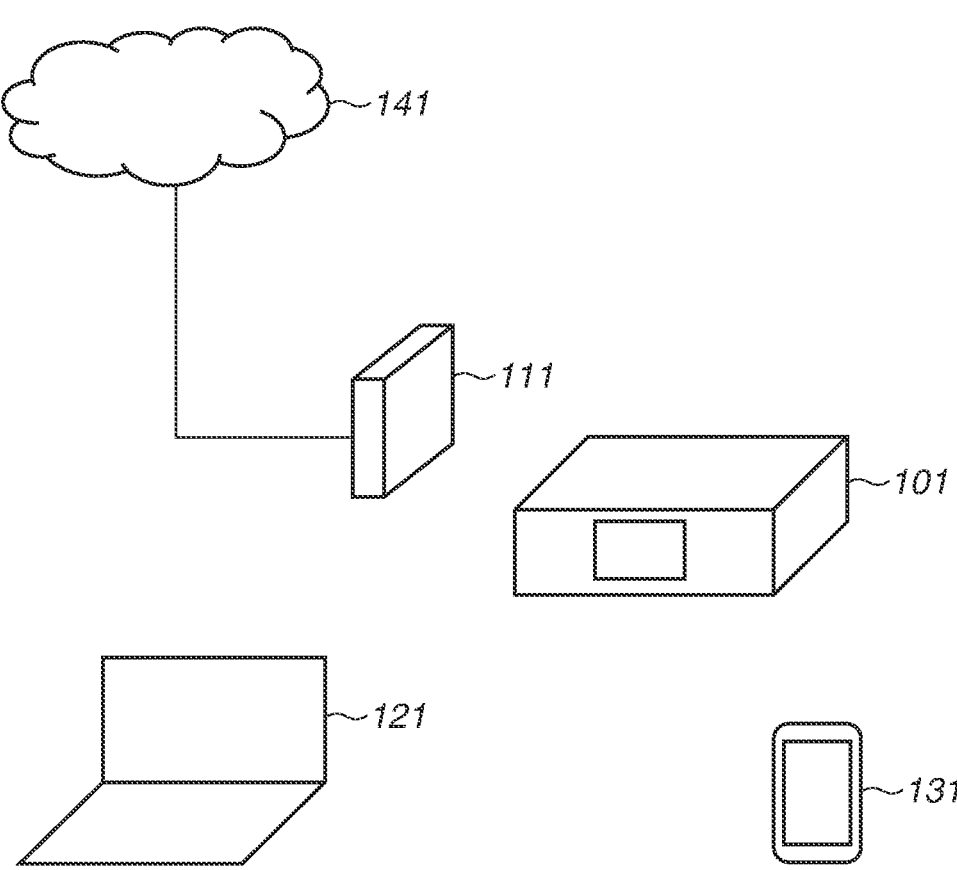
FIG. 1 illustrates a network configuration to which the present disclosure is applicable.

Exemplary embodiments will be described in detail below with reference to the accompanying drawings. Configurations described below are merely examples, and the present invention is not limited to the configurations illustrated in the drawings.

An example of a wireless local area network (LAN) system that supports the Institute of Electrical and Electronics Engineers (IEEE) 802.11 standard will be described below. In addition to the IEEE 802.11 standard family, the wireless LAN system may support other communication standards, such as Bluetooth®, Near Field Communication (NFC), Ultra-Wide Band (UWB), ZigBee (registered trademark), and Multiband Orthogonal Frequency Division Multiplexing Alliance (MBOA). The UWB includes a wireless universal serial bus (USB) and Wireless 1394. The following exemplary embodiments are not intended to limit the scope of the claimed invention. While a plurality of features is described in the exemplary embodiments, not all of the plurality of features is necessarily essential to every embodiment of the present disclosure, and the plurality of features may be freely combined. In the accompanying drawings, an identical or similar component is denoted by an identical reference number, and an overlapping description thereof is omitted.

FIG. 1 illustrates a network configuration to which various embodiments of the present disclosure are applicable. FIG. 1 illustrates a wireless communication apparatus 101 including a plurality of stations (STAs). The wireless communication apparatus 101 may be a printer, a camera, a personal computer (PC), a television (TV), a projector, an Internet of things (IoT) device, such as a smart home appliance, and a smart device, such as a smartphone and a tablet, and any wireless communication apparatus that includes the plurality of STAs is applicable. The wireless communication apparatus 101 operates the plurality of STAs in parallel, thus establishing a connection with an access point (AP) and a group owner (GO) in parallel. The plurality of STAs included in the wireless communication apparatus 101 can further have a Wireless Fidelity Direct (WFD) function in conformity with the WFD standard. In the WFD standard, defined is a protocol that determines whether each wireless terminal (AP or STA) operates as a GO or a client (hereinafter referred to as CL). The execution of the above-mentioned protocol determines which one of the wireless terminals serves as the GO and which one of wireless terminals serves as the CL, so that the GO and the CL are connected to communicate with each other. The establishment of the connection mentioned herein means that an apparatus is brought into a state of being able to transmit and receive signals and data, and that a line and/or a transmission channel (link) in a state where a pair of apparatuses is able to communicate with each other is/are established.

An AP 111 is a wireless communication apparatus including an AP. Herein, the AP 111 is capable of connecting to the STA, and may be a wireless router, a modem, a smart device, such as a smartphone, a tablet, and a smart watch, and a PC.

A PC 121 is a wireless communication apparatus including the STA. Each PC 121 includes the STA and is capable of establishing connection with the AP.

A GO 131 is a smart device that is capable of operating as the GO and is capable of connecting to the wireless communication apparatus that operates as the CL.

A wide area network (hereinafter referred to as WAN) 141 connects to the WAN 141, so that the wireless communication apparatus 101 that currently connects to each AP connects to the WAN 141 using each AP as a gateway.

Figure 2:
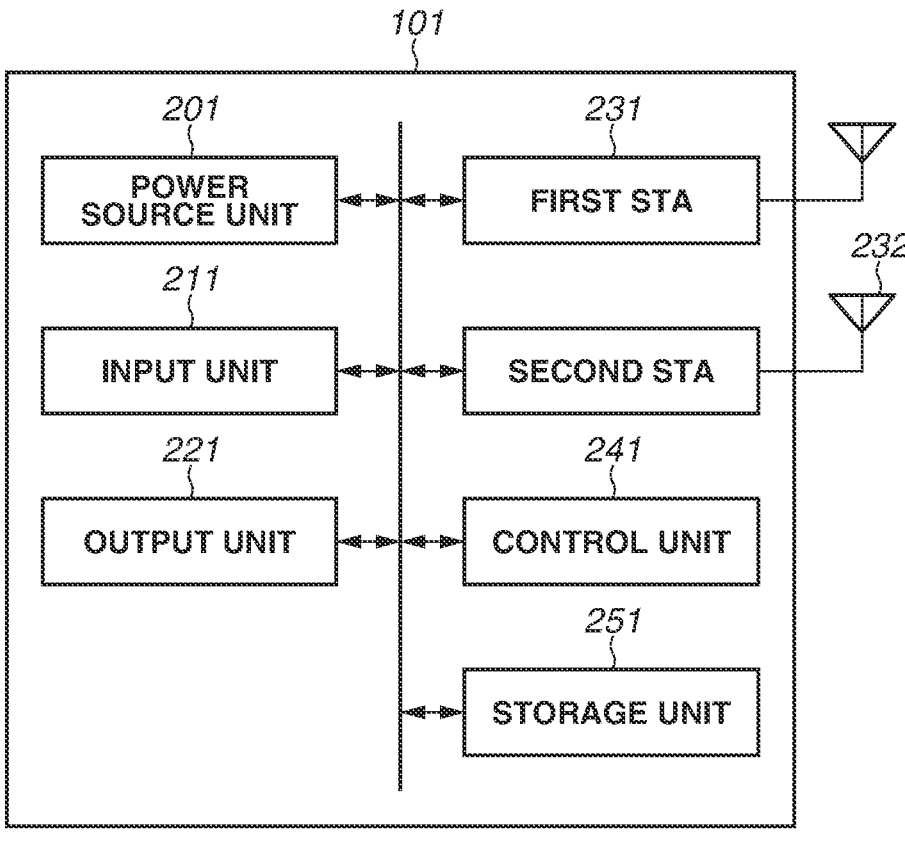
FIG. 2 illustrates a configuration of a wireless communication apparatus.

FIG. 2 illustrates a configuration of the wireless communication apparatus 101.

A power source unit 201 supplies power to each hardware device. The power source unit 201 acquires power from, for example, an alternating current (AC) power source and a battery.

An input unit 211 receives various operations from a user. For example, the input unit 211 includes an operation button.

An output unit 221 provides various output to the user. Examples of the output from the output unit 221 herein include display with a light emitting diode (LED), screen display, audio output from a speaker, and vibration output. Both of the input unit 211 and the output unit 221 may be implemented with one module, as with a touch panel. The input unit 211 and the output unit 221 are not necessarily incorporated in the wireless communication apparatus 101, and may be configured to be capable of providing input and output via a terminal or the like that is different from the wireless communication apparatus 101. The following description will be provided assuming that input and output are provided with use of the touch panel.

A first STA 232 and a second STA 232 perform wireless LAN control and transmission and reception of electric waves in conformity with the IEEE 802.11 standard, and connect to the AP or the GO. The wireless communication apparatus 101 is configured to be capable of operating the two STAs in parallel, and is simultaneously connectable to the AP and the GO. The first STA 231 and the second STA 232 each have the WFD function, and are capable of operating as the GO or the CL.

A control unit 241 includes a processor, such as a central processing unit (CPU) and a micro processing unit (MPU), and controls the entire wireless communication apparatus 101 by executing a program stored in a storage unit 251. The control of the entire wireless communication apparatus 101 may be performed by, instead of the control unit 241, a plurality of hardware devices which shares the load of processing.

The storage unit 251 is composed of a memory, such as a random-access memory (RAM) and a read-only memory (ROM), and stores a program for performing various types of processing, which will be described later, and information about the AP and/or the GO to which the STA is connecting. The storage unit 251 may be configured to preliminarily acquire and store various types of information such as connection information to be used by the wireless communication apparatus 101 to connect to other wireless communication apparatuses using the STA.

Figure 3:
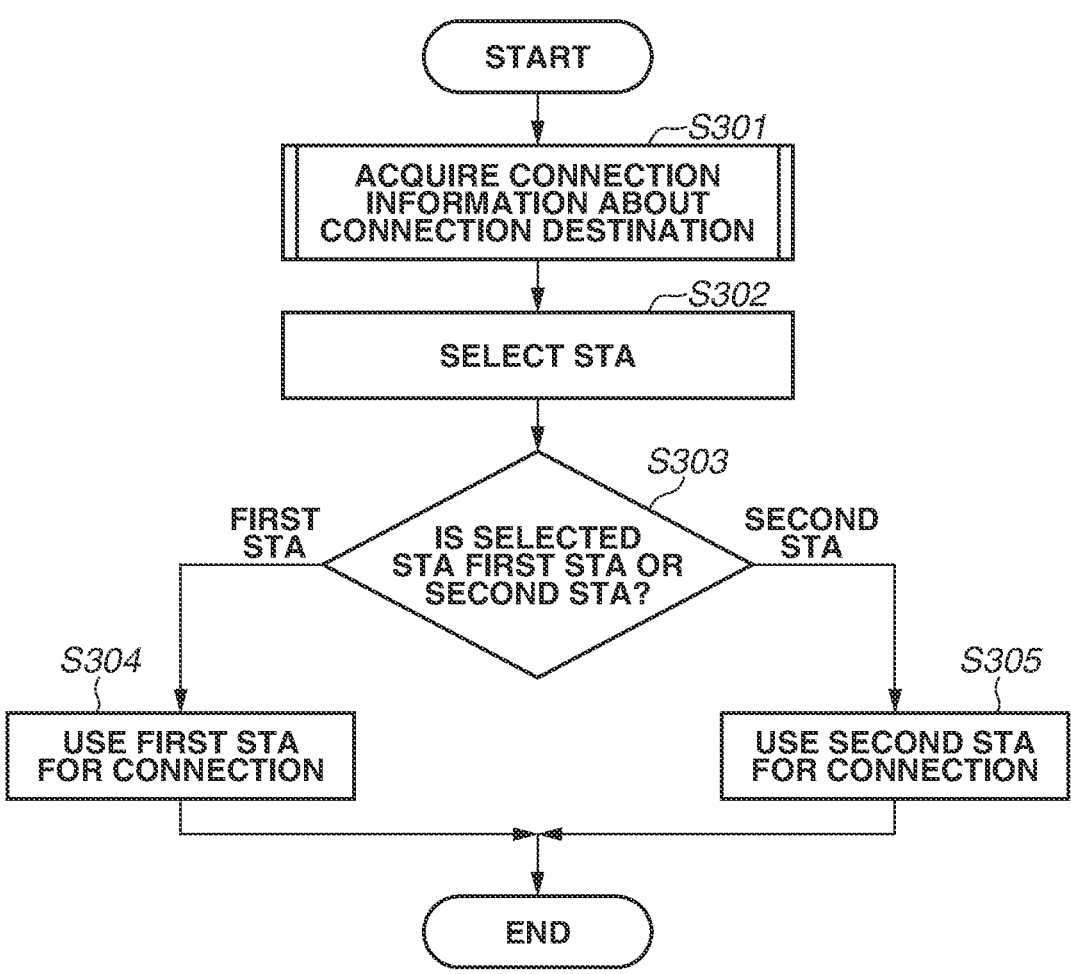
FIG. 3 is a flowchart of setting processing of the wireless communication apparatus.

A first exemplary embodiment of the present disclosure will be described below. In the first exemplary embodiment, connection setting processing of connecting to an external AP is described with reference to a flowchart of the connection setting processing which is performed by the wireless communication apparatus 101 in FIG. 3.

The connection setting processing is started when a connection destination of the wireless communication apparatus 101 is set. Examples of such a case include a case where the user operates the touch panel and selects a setting menu to set the connection destination of the wireless communication apparatus 101.

In step S301, after starting the setting processing, the wireless communication apparatus 101 acquires the connection information about the connection destination. In the acquisition processing in step S301, the wireless communication apparatus 101 may acquire the connection information about the connection destination based on communication with an external wireless communication apparatus, or may acquire the connection information about the connection destination based on input by the user. For example, the wireless communication apparatus 101 may acquire information about the AP 111 by communicating with the PC 121 or the GO 131, and may acquire the information about the AP 111 by communicating with the AP 111. The wireless communication apparatus 101 may acquire the information about the AP 111 based on information input by the user. The connection destination herein refers to a wireless communication apparatus that establishes a connection by using the connection information acquired by the wireless communication apparatus 101. The connection information herein refers to a media access control (MAC) address of the external wireless communication apparatus, a service set identifier (SSID) of a network that is formed by the external wireless communication apparatus, a password, and other types of information. The connection information may be information about a security setting or the like, such as a parameter for encryption of communication. In the following description, establishment of a link to the connection destination is referred to as connection, and establishment of a link to the external wireless communication apparatus for acquisition of the connection information about the connection destination is referred to temporary connection.

Subsequently, in step S302, the wireless communication apparatus 101 selects an STA to be used for establishment of connection with the connection destination. In the present exemplary embodiment, the wireless communication apparatus 101 determines whether the connection destination is the AP or the GO based on a character string of the SSID, which is the connection information about the connection destination. In this case, the wireless communication apparatus 101 determines, if a character string "DIRECT-" is included at the top of the SSID, that the connection destination is the GO, and determines, if the character string "DIRECT-" is not included at the top of the SSID, that the connection destination is the AP. If the wireless communication apparatus 101 determines that the connection destination is the AP as a result of the determination, the wireless communication apparatus 101 selects use of the first STA 231. If the wireless communication apparatus 101 determines that the connection destination is the GO, the wireless communication apparatus 101 selects the use of the second STA 232.

If the first STA 231 is selected in the selection processing in step S302 (FIRST STA in step S303), the processing proceeds to step S304. In step S304, the wireless communication apparatus 101 performs connection processing for connecting to the connection destination using the first STA 231.

If the second STA 232 is selected in the selection processing in step S302 (SECOND STA in step S303), the processing proceeds to step S305. In step S305, the wireless communication apparatus 101 performs connection processing for connecting to the connection destination using the second STA 232.

If the wireless communication apparatus 101 fails to establish connection to the connection destination in the connection processing in step S303 or S304, the wireless communication apparatus 101 may provide an error notification indicating that the setting has not been completed.

In this manner, in the present exemplary embodiment, the wireless communication apparatus 101 including the plurality of STAs initially acquires the connection information to be used to establish a connection to the connection destination. Subsequently, the wireless communication apparatus 101 determines whether another wireless communication apparatus serving as the connection destination is the AP or the GO based on the acquired connection information. The wireless communication apparatus 101 including the plurality of STAs selects one STA included in the wireless communication apparatus 101 based on a result of the determination, and establishes a connection to the other wireless communication apparatus serving as the connection destination using the selected STA.

In typical techniques, the user has to select which STA is to be used when a wireless communication apparatus including a plurality of STAs acquires the connection information about the connection destination. In contrast to this, the present exemplary embodiment simplifies a user operation by automatic selection of an STA for connection to the connection destination based on the connection information about the connection destination acquired by the wireless communication apparatus 101. Selecting the STA for connection to the connection destination depending on whether the connection destination is the AP or the GO prevents connection of only the AP or only the GO to the plurality of STAs.

A second exemplary embodiment of the present disclosure will be described below. In the second exemplary embodiment, a description will be provided of a case where the wireless communication apparatus 101 determines whether the connection destination is the AP or the GO based on the connection information about the connection destination acquired in a cableless setup mode, and selects the STA for connection to the connection destination. In a cableless setup, the wireless communication apparatus 101 acquires the connection information for connection to an external wireless communication apparatus (AP 111 or GO 131), which is the connection destination, from a mobile terminal (PC 121), which is different from the connection destination. In the present exemplary embodiment, the wireless communication apparatus 101 further includes the AP.

Figure 4:
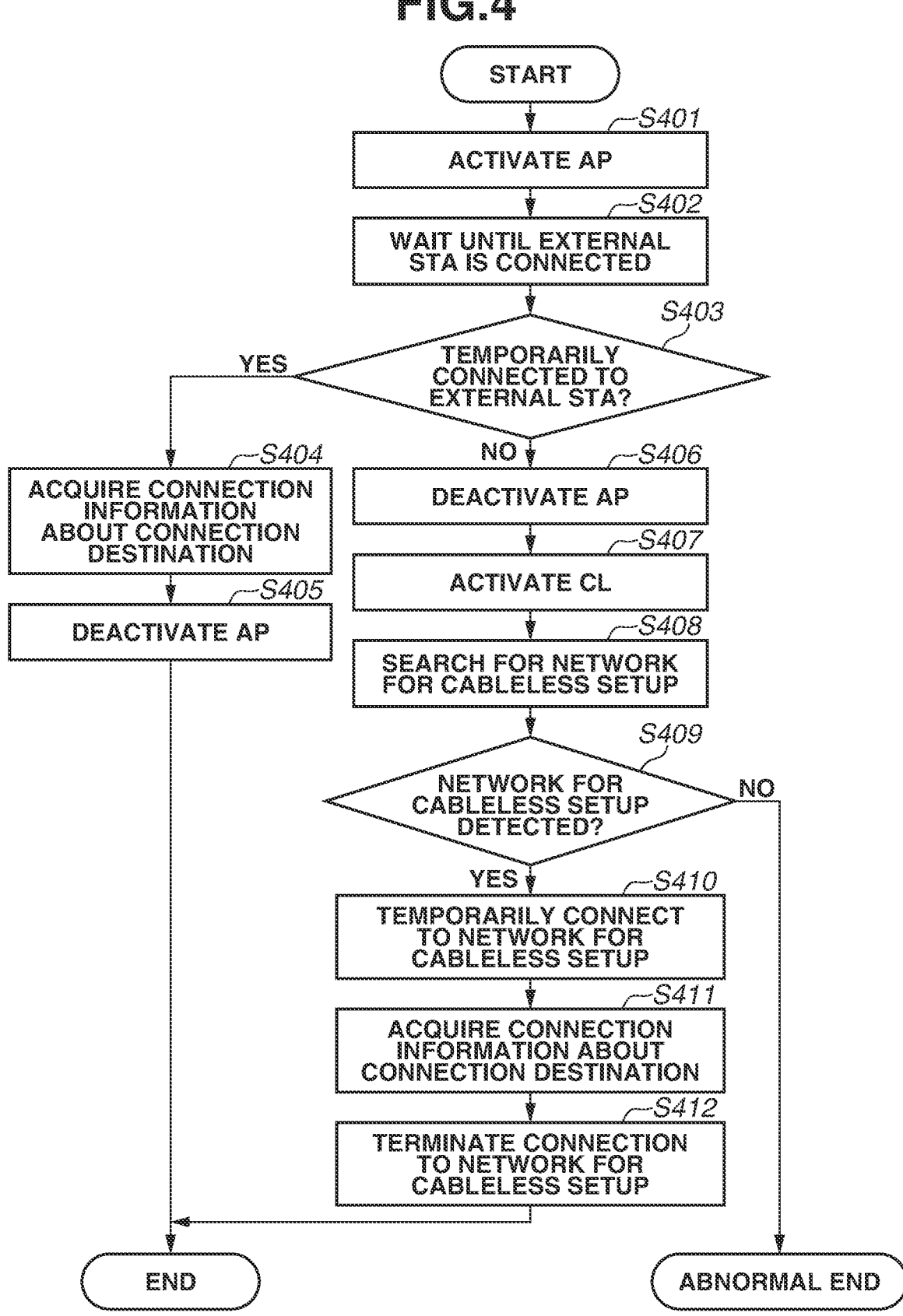
FIG. 4 is a flowchart of acquisition processing of the wireless communication apparatus.

FIG. 4 is a flowchart of the acquisition processing in step S301 according to the present exemplary embodiment, and is executed when the wireless communication apparatus 101 acquires the connection information about the connection destination in the cableless setup mode. The cableless setup mode is a dedicated mode in which wireless setting of wireless infrastructure communication is settable. The wireless communication apparatus 101 activates the AP in the cableless setup mode, and causes the AP to operate as a parent station. The AP activated at this timing is a parent station for the cableless setup mode. This enables a PC and/or a mobile terminal, such as a smartphone and a tablet, to connect, as the STA (child station), to the wireless communication apparatus 101 and communicate therewith. In the cableless setup mode, the WFD function may be used. However, in a case where the WFD function is used, a randomly generated character string is to be included in the SSID as a network identifier. With use of a LAN setting-dedicated application that operates on an external apparatus such as the PC, the smartphone, and the tablet, the external apparatus is easily connected to the wireless communication apparatus 101 even for a user with little knowledge about the LAN. The LAN setting-dedicated application transmits the connection information to be used for connection to the wireless communication apparatus 101 with the user not knowing about details of settings.

In step S401, the wireless communication apparatus 101 initially activates the AP in the acquisition processing in step S301 in the present exemplary embodiment. In step S401, the wireless communication apparatus 101 forms a network for the cableless setup to receive the information about the AP or the GO each of which is the connection destination from the external portable terminal.

Subsequently, in step S402, the wireless communication apparatus 101 waits for a predetermined time period until the external STA (mobile terminal) connects to the network for the cableless setup which has been formed in step S401 and is to be used for acquisition of the connection information about the connection destination. The network for the cableless setup herein refers to a network in which a character string "PrinterSetup" or "DIRECT-PrinterSetup" is included in its SSID.

Subsequently, in step S403, the wireless communication apparatus 101 checks whether the wireless communication apparatus 101 has temporarily connected to the external STA in the network for the cableless setup. If the wireless communication apparatus 101 confirms that the wireless communication apparatus 101 has temporarily connected to the external STA (YES in step S403), the processing proceeds to step S404. In step S404, the wireless communication apparatus 101 acquires the connection information about the connection destination from the external STA. In step S405, the wireless communication apparatus 101 deactivates the AP that forms the network for the cableless setup in response to acquiring the connection information about the connection destination.

If the wireless communication apparatus 101 has not temporarily connected to the external STA even after elapse of a predetermined amount of time and a time-out occurs (NO in step S403), the processing proceeds to step S406. In step S406, the wireless communication apparatus 101 deactivates the AP. In step S407, the wireless communication apparatus 101 activates the CL. Subsequently, in step S408, the wireless communication apparatus 101 searches for a network for the cableless setup formed by the external apparatus serving as the GO. Subsequently, in step S409, the wireless communication apparatus 101 checks whether the network for the cableless setup formed by the external GO is detected. If the network for the cableless setup has been detected (YES in step S409), the processing proceeds to step S410. In step S410, the wireless communication apparatus 101 temporarily connects to the GO that establishes the network for the cableless setup. In step S411, the wireless communication apparatus 101 acquires the connection information about the connection destination from the GO.

In step S412, after the connection information about the connection destination is acquired in step S411, the wireless communication apparatus 101 terminates temporary connection to the GO and ends the acquisition processing.

If the network for the cableless setup formed by the external GO is not detected and a time-out occurs (NO in step S409), the processing ends as an abnormal end. When the processing ends as the abnormal end, the wireless communication apparatus 101 may provide a notification about the abnormal end by, for example, displaying an error.

After the acquisition of the connection information about the connection destination, as in the first exemplary embodiment, the wireless communication apparatus 101 determines in step S302 whether the connection destination is the AP or the GO based on the connection information about the connection destination acquired in step S301.

If the wireless communication apparatus 101 determines that the connection destination is the AP, the wireless communication apparatus 101 connects to the connection destination using the first STA 231.

If the wireless communication apparatus 101 determines that the connection destination is the GO, the wireless communication apparatus 101 establishes connection to the connection destination using the second STA 232.

While the description has been provided of the example in which the wireless communication apparatus 101 activates the AP first in performing the cableless setup, and then activates the CL in a case where the connecting to the external STA fails, the configuration is not limited thereto. For example, the wireless communication apparatus 101 may perform control to activate the CL first, and then activate the AP in a case where the network for cableless setup is not detected.

In this manner, according to the present exemplary embodiment, the wireless communication apparatus 101 initially acquires the connection information about the connection destination from the portable terminal, which is different from the connection destination, and determines whether the connection destination is the AP or the GO based on the connection information. The wireless communication apparatus 101 including the first STA 231 and the second STA 232 establishes connection to the connection destination using the first STA 231 in a case where the connection destination is the AP, and establishes connection to the connection destination using the second STA 232 in a case where the connection destination is the GO. This configuration makes it possible for the wireless communication apparatus 101 including the plurality of STAs which is to connect to the AP and the GO to prevent the plurality of STAs from connecting to only one of the AP or the GO.

A third exemplary embodiment of the present disclosure will be described below. In the third exemplary embodiment, a description is provided of a case where the wireless communication apparatus 101 sequentially selects STAs one by one when selecting an STA to be used for establishment of connection to the connection destination.

Figure 5:
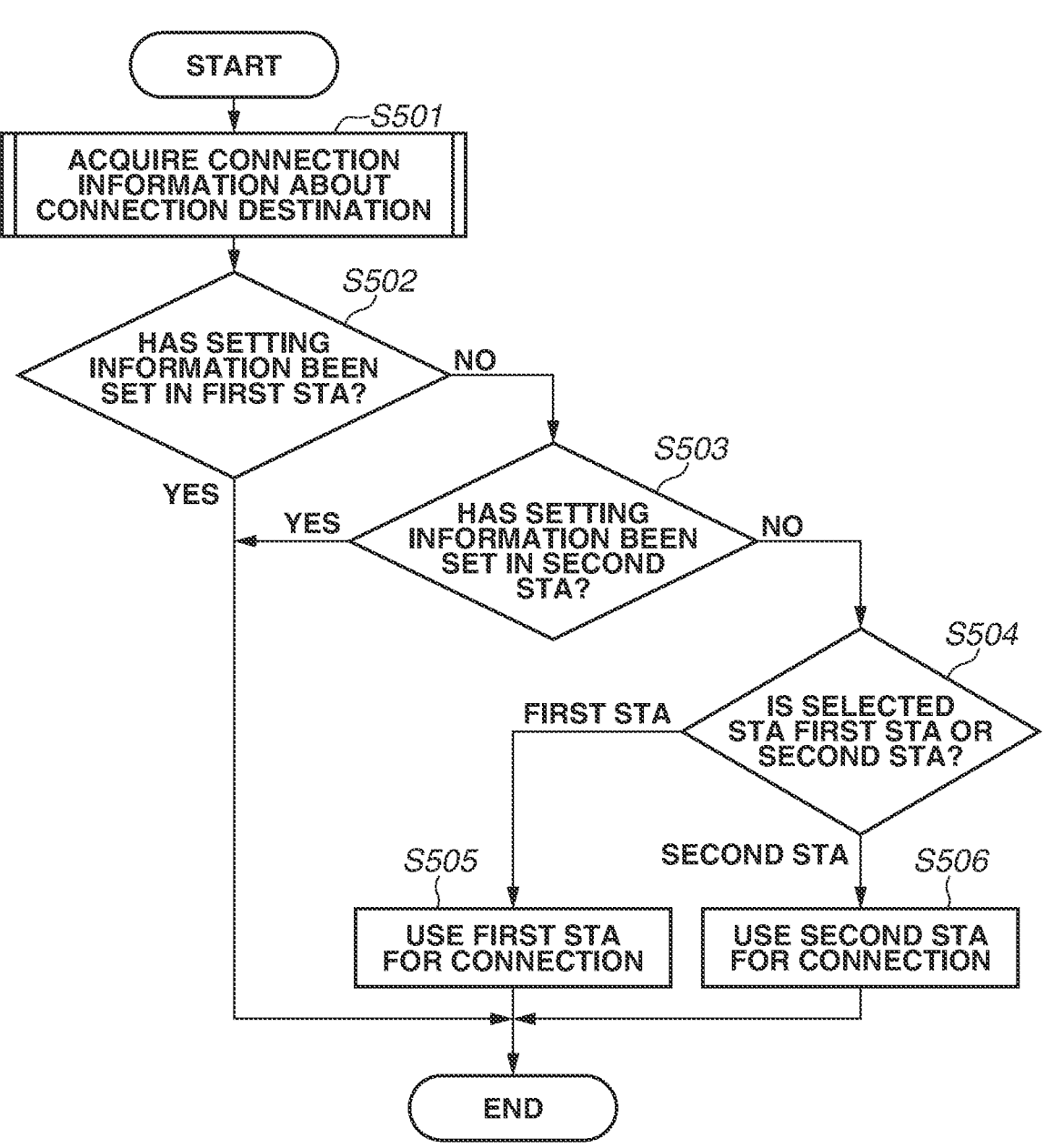
FIG. 5 is a second flowchart of setting processing of the wireless communication apparatus.

FIG. 5 illustrates a second flowchart of connection setting processing which is performed by the wireless communication apparatus 101 according to the present exemplary embodiment. This connection setting processing is started in a case where the connection destination of the wireless communication apparatus 101 is set. Examples of such a case include a case where the user operates the touch panel and selects the setting menu to set the connection destination of the wireless communication apparatus 101.

In step S501, after the connection setting processing is started, the wireless communication apparatus 101 acquires the connection information about the connection destination from the external wireless communication apparatus. For example, the wireless communication apparatus 101 acquires the connection information about the connection destination in a manner similar to the acquisition processing (cableless setup) in the second exemplary embodiment.

After acquiring the connection information about the connection destination, the wireless communication apparatus 101 checks whether each STA included in the wireless communication apparatus 101 is participating in the network having the acquired SSID. In the present exemplary embodiment, initially in step S502, the wireless communication apparatus 101 determines whether the connection information about the connection destination has been set in the first STA 231. Subsequently, in step S503, the wireless communication apparatus 101 determines whether the connection information about the connection destination has been set in the second STA 232. If the wireless communication apparatus 101 determines that the connection information about the connection destination has been set (YES in step S502 or step S503), the connection setting processing ends. In this manner, the wireless communication apparatus 101 checks whether the acquired information has been set in each STA after the acquisition of the connection information about the connection destination, thus preventing establishment of overlapping links.

If the wireless communication apparatus 101 determines that the wireless communication apparatus 101 determines that the connection information about the connection destination acquired in step S501 has not been set in each STA (NO in step S502 and step S503), the processing proceeds to step S504. In step S504, the wireless communication apparatus 101 selects an STA that is not used in the previous connection setting processing. For example, in a case where connection is established with use of the first STA 231 in the previous connection setting processing, the wireless communication apparatus 101 selects the use of the second STA 232. In a case where the wireless communication apparatus 101 includes three or more STAs, the STAs may be sequenced. By sequencing the STAs, the wireless communication apparatus 101 may select an STA next to an STA used in the previous connection setting processing.

If the first STA 231 is selected (FIRST STA in step S504), the processing proceeds to step S505. In step S505, the wireless communication apparatus 101 activates the first STA 231, sets the connection information about the connection destination acquired in step S501 in the first STA 231, and establishes connection with the connection destination. If the second STA 232 is selected (SECOND STA in step S504), the processing proceeds to step S506. In step S506, the wireless communication apparatus 101 activates the second STA 232, sets the connection information about the connection destination acquired in step S501 in the second STA 232, and establishes connection to the connection destination.

In this manner, in a case where the connection information about the connection destination is acquired, the STA to be used this time is automatically selected depending on the STA used in the previous connection setting processing in the present exemplary embodiment, thus reducing man-hours of the user when the connection setting processing is performed.

Figure 6:
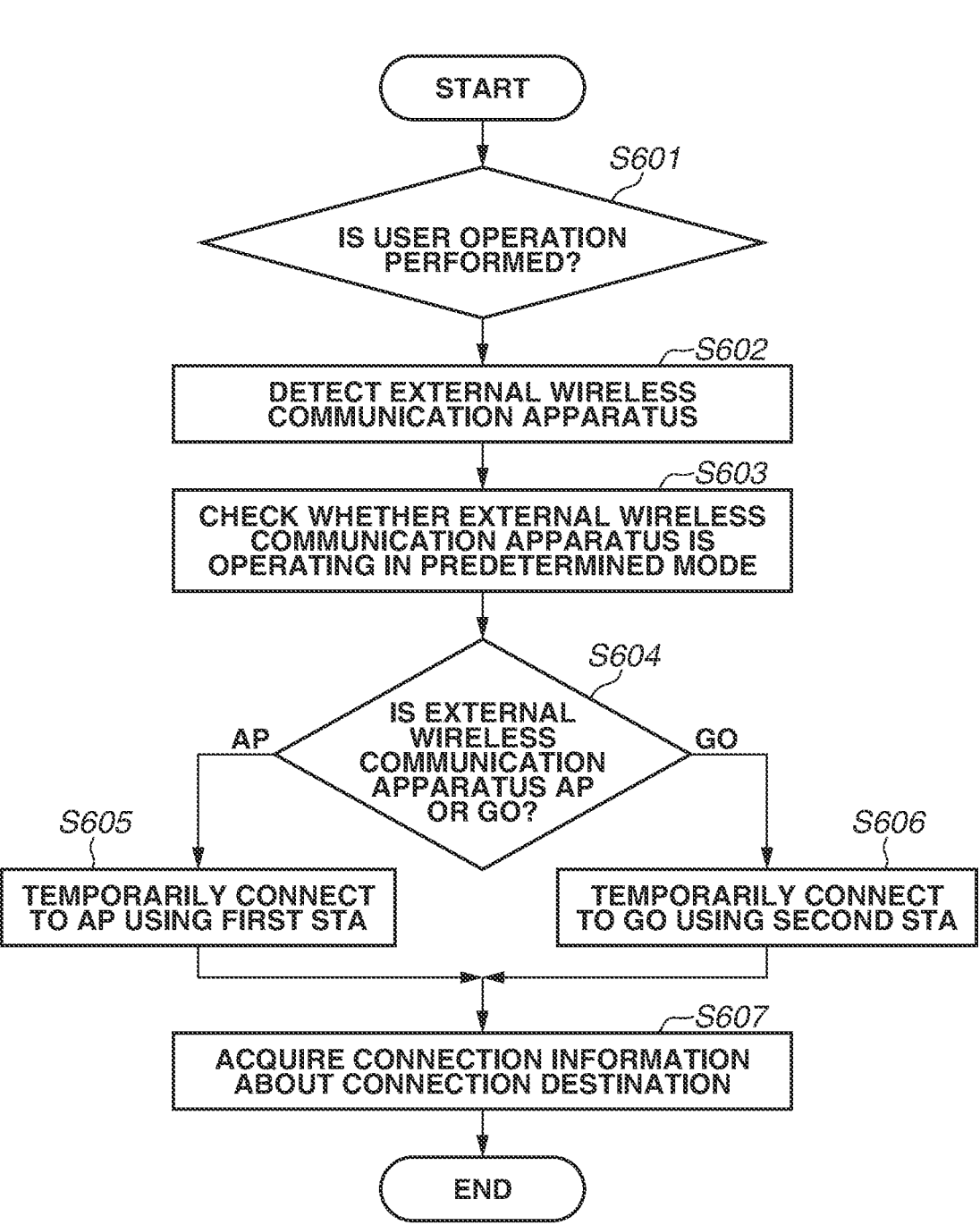
FIG. 6 is a second flowchart of acquisition processing of the wireless communication apparatus.

A fourth exemplary embodiment of the present disclosure will be described. In the fourth exemplary embodiment, a description will be provided of a case where the operation in step S301 to acquire the connection information about the connection destination is different from the cableless setup in the second exemplary embodiment, with reference to a second flowchart of acquisition processing in FIG. 6. Assume that processing after the acquisition of the connection information about the connection destination is similar to that in the second or third exemplary embodiment.

In the acquisition processing in step S301 in the present exemplary embodiment, the wireless communication apparatus 101 acquires the connection information about the connection destination in conformity with, for example, a protocol of the WPS. The term WPS herein refers to the Wi-Fi protected setup, and is a protocol designed to easily exchange parameters for establishment of connection between the AP and the STA.

In the acquisition processing in step S301 in the present exemplary embodiment, the wireless communication apparatus 101 acquires the connection information about the connection destination by performing, for example, a push button configuration (PBC) operation of the WPS. The term PBC operation herein refers to a mechanism to operate the protocol of the WPS by, for example, pushing of a WPS button attached to each of the AP and the STA. In such a case, in step S601, the wireless communication apparatus 101 monitors whether a user operation indicating a command for operating the PBC operation of the WPS has been performed. The user operation mentioned herein refers to mainly pushing of the WPS button or an AirStation One-Touch Secure System (AOSS) button, but may be providing of a command for the PBC operation through an operation of the touch panel or remote control.

Subsequently, if the wireless communication apparatus 101 detects the user operation, the wireless communication apparatus 101 transmits a probe request using the first STA 231. At this time, assume that the wireless communication apparatus 101 includes, in the probe request, information indicating that the wireless communication apparatus 101 is performing the PBC operation. In step S602, the wireless communication apparatus 101 receives a probe response transmitted from the external wireless communication apparatus, thus detecting the external wireless communication apparatus.

Subsequently, in step S603, the wireless communication apparatus 101 checks whether the external wireless communication apparatus detected in step S602 is operating in a predetermined operation mode. More specifically, the wireless communication apparatus 101 checks whether the information indicating that the external wireless communication apparatus is performing the PBC operation is included in the received probe response, and thereby checks whether the detected external wireless communication apparatus is operating in the WPS mode.

As a result of the operation in step S603, if an external AP operating in the WPS mode is present (AP in step S604), the processing proceeds to step S605. In step S605, the wireless communication apparatus 101 temporarily connects to the AP using the first STA 231. In step S607, the wireless communication apparatus 101 acquires the connection information about the connection destination, and ends the processing.

As a result of the operation in step S603, if an external GO operating in the WPS mode is present (GO in step S603), the processing proceeds to step S606. In step S606, the wireless communication apparatus 101 temporarily connects to the GO using the second STA 232. In step S607, the wireless communication apparatus 101 acquires the connection information about the connection destination, and ends the processing.

In the present exemplary embodiment, the wireless communication apparatus 101 includes the first STA 231 and the second STA 232, thus temporary connecting to the AP or the GO without performing detection again irrespective of whether the detected wireless communication apparatus is the AP or the GO to acquire the connection information about the connection destination.

Other Exemplary Embodiments

The wireless communication apparatus 101 described in the present exemplary embodiment may be a printer including a print unit.

In a case where the wireless communication apparatus 101 operates as the printer, the wireless communication apparatus 101 is capable of printing image data acquired by, for example, communicating with a partner apparatus.

The wireless communication apparatus 101 described in the present exemplary embodiment may be a camera including an imaging unit. In a case where the wireless communication apparatus 101 operates as the camera, the wireless communication apparatus 101 is capable of transmitting data of a captured image by, for example, communicating with a partner apparatus.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to various embodiments of the present disclosure, it is possible to enhance operability when a wireless communication apparatus including a plurality of STAs connects to an external AP or an external GO.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-165566, filed Oct. 14, 2022, which is hereby incorporated by reference herein in its entirety.

What is claimed is:

1. A wireless communication apparatus including a plurality of stations, the wireless communication apparatus comprising:

at least one memory storing a program; and at least one processor that, upon execution of the stored program, is configured to operate as:

an acquisition unit configured to acquire connection information to be used to establish a connection to another wireless communication apparatus;

a determination unit configured to determine whether the another wireless communication apparatus is an access point or a group owner based on the connection information acquired by the acquisition unit; and an establishment unit configured to select one of a first station or a second station included in the wireless communication apparatus based on a result of determination by the determination unit and establish a connection to the another wireless communication apparatus using the selected first station or second station, wherein the establishment unit is configured to establish the connection to the another wireless communication apparatus using the first station in a case where the determination unit determines that the another wireless communication apparatus is the access point, and establish the connection to the another wireless communication apparatus using the second station in a case where the determination unit determines that the another wireless communication apparatus is the group owner.

2. The wireless communication apparatus according to claim 1, wherein the connection information includes at least a service set identifier, and wherein the determination unit is configured to make the determination based on a character string included in the service set identifier.

3. The wireless communication apparatus according to claim 2, wherein the determination unit is configured to determine that the another wireless communication apparatus is the group owner in a case where a character string "DIRECT" is included at top of the service set identifier, and determine that the another wireless communication apparatus is the access point in a case where the character string "DIRECT" is not included at the top of the service set identifier.

4. The wireless communication apparatus according to claim 1, wherein the acquisition unit is configured to acquire the connection information from a portable terminal that is different from the another wireless communication apparatus.

5. The wireless communication apparatus according to claim 1, wherein the acquisition unit is configured to acquire the connection information based on a protocol of a Wireless Fidelity Protected Setup.

6. The wireless communication apparatus according to claim 1, further comprising:

a reception unit configured to receive image data from the another wireless communication apparatus through the connection established by the establishment unit; and a print unit configured to print the image data received by the reception unit.

7. A control method for a wireless communication apparatus including a plurality of stations, the method comprising:

acquiring connection information to be used to establish a connection to another wireless communication apparatus;

determining whether the another wireless communication apparatus is an access point or a group owner based on the acquired connection information; and selecting one of a first station or a second station included in the wireless communication apparatus based on a result of the determination in the determining and establishing a connection to the another wireless communication apparatus using the selected first station or second station, wherein the connection to the another wireless communication apparatus is established using the first station in a case where the determination determines that the another wireless communication apparatus is the access point, and the connection to the another wireless communication apparatus is established using the second station in a case where the determination determines that the another wireless communication apparatus is the group owner.

8. A non-transitory computer-readable storage medium storing instructions that, when executed by a computer, cause the computer to perform a control method for a wireless communication apparatus including a plurality of stations, the method comprising:

acquiring connection information to be used to establish a connection to another wireless communication apparatus;

determining whether the another wireless communication apparatus is an access point or a group owner based on the acquired connection information; and selecting one of a first station or a second station included in the wireless communication apparatus based on a result of the determination in the determining and establishing a connection to the another wireless communication apparatus using the selected first station or second station, wherein the connection to the another wireless communication apparatus is established using the first station in a case where the determination determines that the another wireless communication apparatus is the access point, and the connection to the another wireless communication apparatus is established using the second station in a case where the determination determines that the another wireless communication apparatus is the group owner.

* * * * *